US012093685B2

(12) United States Patent
Tamir et al.

(10) Patent No.: US 12,093,685 B2
(45) Date of Patent: *Sep. 17, 2024

(54) REPRESENTING SOURCE CODE AS IMPLICIT CONFIGURATION ITEMS

(71) Applicant: ServiceNow, Inc., Santa Clara, CA (US)

(72) Inventors: Giora Tamir, San Diego, CA (US); Kurt Zettel, Nashville, TN (US); Naveen Bojja, San Diego, CA (US); Brian James Waplington, San Diego, CA (US); Maulik Shah, San Diego, CA (US); Thomas Brotherton, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/591,940

(22) Filed: Feb. 3, 2022

(65) Prior Publication Data

US 2022/0156063 A1 May 19, 2022

Related U.S. Application Data

(63) Continuation of application No. 16/991,704, filed on Aug. 12, 2020, now Pat. No. 11,275,580.

(51) Int. Cl.
*G06F 8/71* (2018.01)
*G06F 8/60* (2018.01)
*G06F 21/57* (2013.01)

(52) U.S. Cl.
CPC .................. *G06F 8/71* (2013.01); *G06F 8/60* (2013.01); *G06F 21/577* (2013.01); *G06F 2221/033* (2013.01)

(58) Field of Classification Search
CPC . G06F 8/60; G06F 8/71; G06F 21/577; G06F 2221/033
See application file for complete search history.

(56) References Cited

U.S. PATENT DOCUMENTS 4,941,084 A 7/1990 Terada et al.
5,185,860 A 2/1993 Wu
(Continued)

FOREIGN PATENT DOCUMENTS

EP 0433979 6/1991
EP 1607824 12/2005
(Continued)

*Primary Examiner* — Douglas M Slachta
(74) *Attorney, Agent, or Firm* — McDonnell Boehnen Hulbert & Berghoff LLP

(57) ABSTRACT

Persistent storage may contain: (i) an explicit configuration item table with entries of explicit configuration items representing hardware devices and executable software applications deployed on the hardware devices, (ii) an implicit configuration item table with entries of implicit configuration items representing units of source code, wherein at least some of the executable software applications are compiled versions of the units of source code, and (iii) an implicit relationship table associating pairs of the configuration items. One or more processors may be configured to receive information related to a particular unit of source code; write, to the implicit configuration item table, at least some of the information as an implicit configuration item; determine that the implicit configuration item has one or more identifying attributes in common with an explicit configuration item; and write, to the implicit relationship table, a new entry associating the implicit configuration item and the explicit configuration item.

20 Claims, 12 Drawing Sheets

(56) References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,764,989 A * | 6/1998 | Gustafsson ......... G06F 9/44521 |
| | | 714/E11.21 |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,983,456 B2 * | 1/2006 | Poznanovic ............ G06F 30/30 |
| | | 717/133 |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,555,497 B2 * | 6/2009 | Thompson ............ G06F 16/188 |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,693,845 B2 * | 4/2010 | Scanzano ............ G06F 16/284 |
| | | 707/999.1 |
| 7,840,490 B1 | 11/2010 | Sellers et al. |
| 7,849,509 B2 * | 12/2010 | Venkatapathy ....... G06F 21/577 |
| | | 717/126 |
| 7,877,783 B1 | 1/2011 | Cline et al. |
| 7,890,869 B1 | 2/2011 | Mayer et al. |
| 7,966,398 B2 | 6/2011 | Wiles, Jr. |
| 7,979,450 B2 * | 7/2011 | Adler .................. G06F 16/2455 |
| | | 707/755 |
| 8,060,396 B1 | 11/2011 | Bessler et al. |
| 8,108,431 B1 | 1/2012 | Guner et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,374,385 B1 * | 6/2016 | Falkowitz ............ H04L 63/145 |
| 10,262,145 B2 * | 4/2019 | Hoernecke ............ G06Q 10/10 |
| 10,489,388 B1 | 11/2019 | Rogynskyy et al. |
| 10,673,963 B1 | 6/2020 | Feiguine et al. |
| 10,749,889 B2 * | 8/2020 | Henderson ............ G06F 16/245 |
| 10,749,943 B1 | 8/2020 | Feiguine et al. |
| 10,771,344 B2 | 9/2020 | Bitterfeld et al. |
| 10,819,587 B2 * | 10/2020 | Singh .................... H04L 41/142 |
| 10,824,650 B2 | 11/2020 | Bar Oz et al. |
| 10,944,654 B2 | 3/2021 | Rimar et al. |
| 11,032,381 B2 * | 6/2021 | Feiguine ............ H04L 67/1097 |
| 11,089,115 B2 | 8/2021 | Garty et al. |
| 11,095,506 B1 | 8/2021 | Erblat et al. |
| 11,106,823 B1 * | 8/2021 | Brook .................. H04L 9/0891 |
| 11,115,471 B2 | 9/2021 | Sant et al. |
| 11,275,580 B2 * | 3/2022 | Tamir ....................... G06F 8/60 |
| 11,657,160 B2 * | 5/2023 | Maekawa ............ G06F 12/0223 |
| | | 726/25 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0051230 A1 | 3/2003 | Molchanov et al. |
| 2003/0118087 A1 | 6/2003 | Goldthwaite et al. |
| 2003/0172367 A1 * | 9/2003 | Kannenberg ............ G06F 9/44 |
| | | 717/101 |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2010/0325620 A1 * | 12/2010 | Rohde ................ G06F 11/3604 |
| | | 717/154 |
| 2011/0131559 A1 * | 6/2011 | Young .................... G06F 8/314 |
| | | 717/145 |
| 2014/0075245 A1 * | 3/2014 | Shim .................. G06F 11/3672 |
| | | 714/38.1 |
| 2014/0096184 A1 * | 4/2014 | Zaitsev .................. G06F 21/50 |
| | | 726/1 |

(56) References Cited

U.S. PATENT DOCUMENTS

| | | | |
|---|---|---|---|
| 2017/0323107 A1* | 11/2017 | Bender | H04L 63/20 |
| 2018/0025059 A1* | 1/2018 | Batchu | G06F 16/24564 |
| | | | 707/740 |
| 2018/0046670 A1 | 2/2018 | Atkins et al. | |
| 2018/0123940 A1 | 5/2018 | Rimar et al. | |
| 2018/0210712 A1* | 7/2018 | Busjaeger | G06F 8/70 |
| 2019/0104398 A1 | 4/2019 | Owen et al. | |
| 2019/0342323 A1* | 11/2019 | Henderson | G06F 16/285 |
| 2020/0050689 A1 | 2/2020 | Tal et al. | |
| 2020/0204443 A1 | 6/2020 | Bar Oz et al. | |
| 2020/0382546 A1* | 12/2020 | Henderson | G06F 40/177 |
| 2021/0064758 A1* | 3/2021 | Zettel, II | G06F 21/577 |
| 2021/0194764 A1 | 6/2021 | Badyan et al. | |
| 2021/0203731 A1 | 7/2021 | Garty et al. | |
| 2021/0224258 A1* | 7/2021 | Faruquie | G06F 16/244 |
| 2021/0349875 A1 | 11/2021 | Gui et al. | |
| 2021/0357593 A1* | 11/2021 | Oara | G06F 40/30 |
| 2021/0392155 A1* | 12/2021 | Waplington | G06F 16/285 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

\* cited by examiner

```
┌─────────────────────────────────────────────────────────────────┐
│ RECEIVE INFORMATION RELATED TO A PARTICULAR UNIT OF SOURCE CODE │
│ ASSOCIATED WITH A MANAGED NETWORK, WHEREIN PERSISTENT STORAGE   │
│ CONTAINS: (I) AN EXPLICIT CONFIGURATION ITEM TABLE WITH ENTRIES OF│
│ EXPLICIT CONFIGURATION ITEMS REPRESENTING HARDWARE DEVICES      │
│ ASSOCIATED WITH THE MANAGED NETWORK AND EXECUTABLE SOFTWARE     │ ← 1000
│ APPLICATIONS DEPLOYED ON THE HARDWARE DEVICES, (II) AN IMPLICIT │
│ CONFIGURATION ITEM TABLE WITH ENTRIES OF IMPLICIT CONFIGURATION │
│ ITEMS REPRESENTING UNITS OF SOURCE CODE ASSOCIATED WITH THE     │
│ MANAGED NETWORK, WHEREIN AT LEAST SOME OF THE EXECUTABLE        │
│ SOFTWARE APPLICATIONS ARE COMPILED VERSIONS OF THE UNITS OF     │
│ SOURCE CODE, AND (III) AN IMPLICIT RELATIONSHIP TABLE ASSOCIATING│
│ PAIRS OF THE IMPLICIT CONFIGURATION ITEMS AND EXPLICIT CONFIGURATION│
│ ITEMS WITH ONE ANOTHER                                          │
└─────────────────────────────────────────────────────────────────┘
                                 │
                                 ▼
┌─────────────────────────────────────────────────────────────────┐
│ WRITE, TO THE IMPLICIT CONFIGURATION ITEM TABLE, AT LEAST SOME OF THE│ ← 1002
│        INFORMATION AS AN IMPLICIT CONFIGURATION ITEM            │
└─────────────────────────────────────────────────────────────────┘
                                 │
                                 ▼
┌─────────────────────────────────────────────────────────────────┐
│ DETERMINE THAT THE IMPLICIT CONFIGURATION ITEM HAS ONE OR MORE  │
│ IDENTIFYING ATTRIBUTES IN COMMON WITH AN EXPLICIT CONFIGURATION │ ← 1004
│          ITEM IN THE EXPLICIT CONFIGURATION ITEM TABLE          │
└─────────────────────────────────────────────────────────────────┘
                                 │
                                 ▼
┌─────────────────────────────────────────────────────────────────┐
│ IN RESPONSE TO DETERMINING THAT THE IMPLICIT CONFIGURATION ITEM HAS│
│  ONE OR MORE IDENTIFYING ATTRIBUTES IN COMMON WITH THE EXPLICIT │
│ CONFIGURATION ITEM, WRITE, TO THE IMPLICIT RELATIONSHIP TABLE, A NEW│ ← 1006
│  ENTRY ASSOCIATING THE IMPLICIT CONFIGURATION ITEM AND THE EXPLICIT│
│                       CONFIGURATION ITEM                        │
└─────────────────────────────────────────────────────────────────┘
```

FIG. 10

REPRESENTING SOURCE CODE AS IMPLICIT CONFIGURATION ITEMS

CROSS-REFERENCE TO RELATED APPLICATION

This application is a continuation of and claims priority to U.S. patent application Ser. No. 16/991,704, filed Aug. 12, 2020, which is hereby incorporated by reference in its entirety.

BACKGROUND

Software applications and hardware devices disposed upon a managed network or public cloud network may be automatically discovered in various ways, and configuration items representing these components may be populated in a configuration management database (CMDB). Alternatively, some configuration items may be manually entered into the CMDB. The CMDB may reside in a remote network management platform separate from the managed network or public cloud network, for example.

Each configuration item may take the form of a database entry with attributes representing the characteristics of the component. This allows the CMDB to serve as a single point of truth with respect to the discovered components, their properties, and their relationships with one another. Numerous applications of the remote network management platform may use the data in the CMDB for purposes of service mapping, asset management, information technology service management, security operations, and so on.

Traditionally, only executable (e.g., compiled) versions of software applications were populated in the CMDB. In some cases, only executing versions of these applications can be discovered. This results in source code forms of applications being excluded from the CMDB. Such source code may be for custom applications developed or under development by the managed network, for example. As a consequence, the remote network management platform applications may be unable to account for at least some versions of these applications, potentially limiting the utility of the remote network management platform for purposes of security, software development operations, and/or service management.

SUMMARY

To overcome these limitations, the embodiments herein use implicit configuration items to represent units of source code under development. Legacy configuration items are referred to as explicit configuration items for purposes of differentiation.

Modified discovery procedures or manual entry can be used to populate the CMDB with implicit configuration items. Further, reconciliation procedures can be used to populate an implicit relationship table in the CMDB with entries, each representing a determined relationship between either: a pair of implicit configuration items, or one implicit configuration item and one explicit configuration item.

These tables facilitate new features and functionality that would otherwise not be possible. For example, source code under development can be associated with compiled versions thereof. This can enable defect and vulnerability tracking between source code and deployed executable applications compiled from the source code. Further, various remote network management applications may use implicit configuration items and/or their associated explicit configuration items to provide new features and functionality.

Accordingly, a first example embodiment may involve persistent storage containing: (i) an explicit configuration item table with entries of explicit configuration items representing hardware devices associated with a managed network and executable software applications deployed on the hardware devices, (ii) an implicit configuration item table with entries of implicit configuration items representing units of source code associated with the managed network, wherein at least some of the executable software applications are compiled versions of the units of source code, and (iii) an implicit relationship table associating pairs of the implicit configuration items and explicit configuration items with one another. The first example embodiment may also involve one or more processors configured to: (i) receive information related to a particular unit of source code associated with the managed network; (ii) write, to the implicit configuration item table, at least some of the information as an implicit configuration item; (iii) determine that the implicit configuration item has one or more identifying attributes in common with an explicit configuration item in the explicit configuration item table; and (iv) possibly in response to determining that the implicit configuration item has one or more identifying attributes in common with the explicit configuration item, write, to the implicit relationship table, a new entry associating the implicit configuration item and the explicit configuration item.

A second example embodiment may involve receiving information related to a particular unit of source code associated with a managed network, wherein persistent storage contains: (i) an explicit configuration item table with entries of explicit configuration items representing hardware devices associated with the managed network and executable software applications deployed on the hardware devices, (ii) an implicit configuration item table with entries of implicit configuration items representing units of source code associated with the managed network, wherein at least some of the executable software applications are compiled versions of the units of source code, and (iii) an implicit relationship table associating pairs of the implicit configuration items and explicit configuration items with one another. The second example embodiment may also involve writing, to the implicit configuration item table, at least some of the information as an implicit configuration item. The second example embodiment may also involve determining that the implicit configuration item has one or more identifying attributes in common with an explicit configuration item in the explicit configuration item table. The second example embodiment may also involve, possibly in response to determining that the implicit configuration item has one or more identifying attributes in common with the explicit configuration item, writing, to the implicit relationship table, a new entry associating the implicit configuration item and the explicit configuration item.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 10 is a flow chart, in accordance with example embodiments.

DETAILED DESCRIPTION

Figure 1:
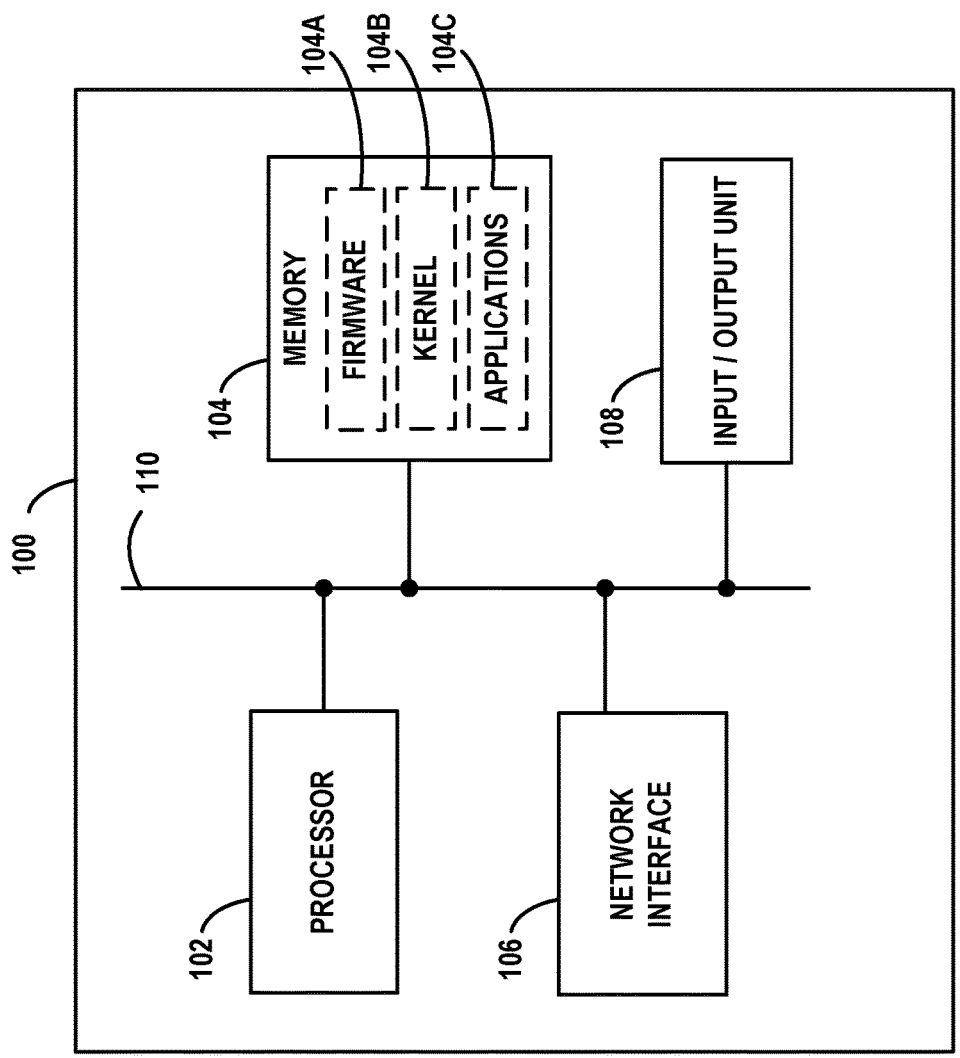
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
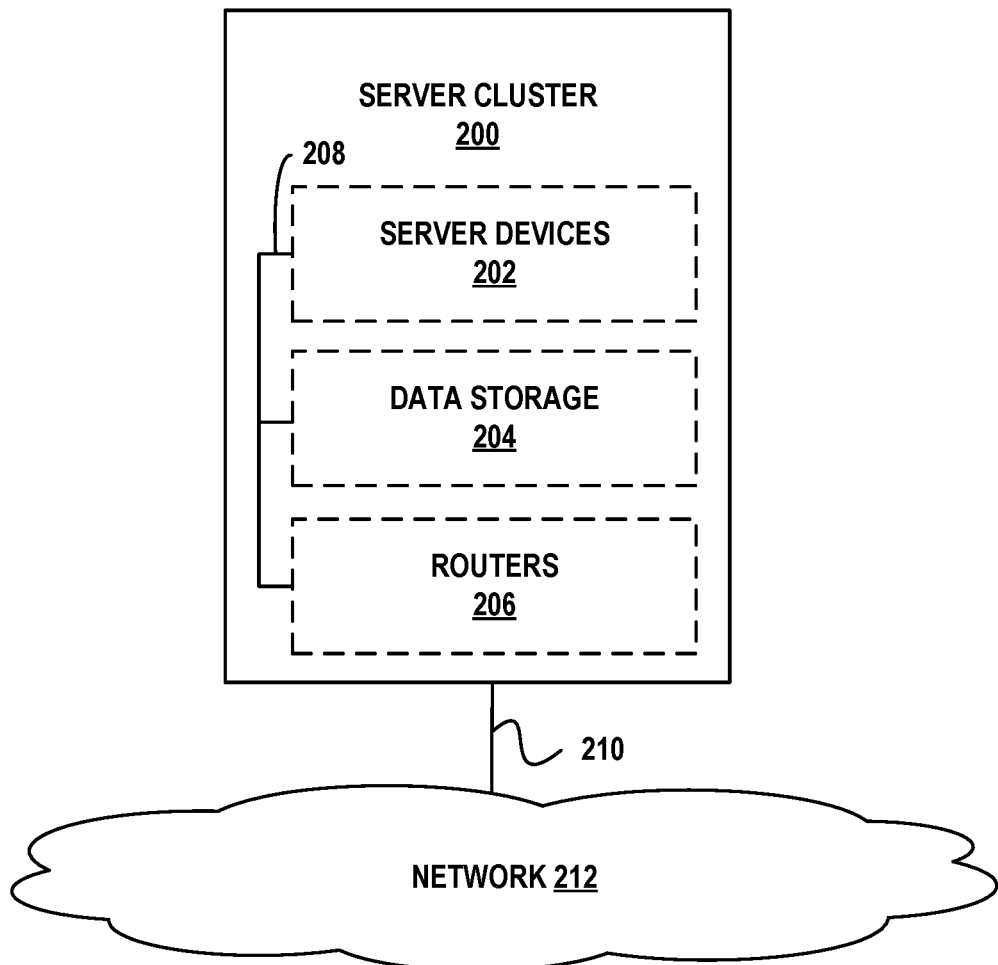
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
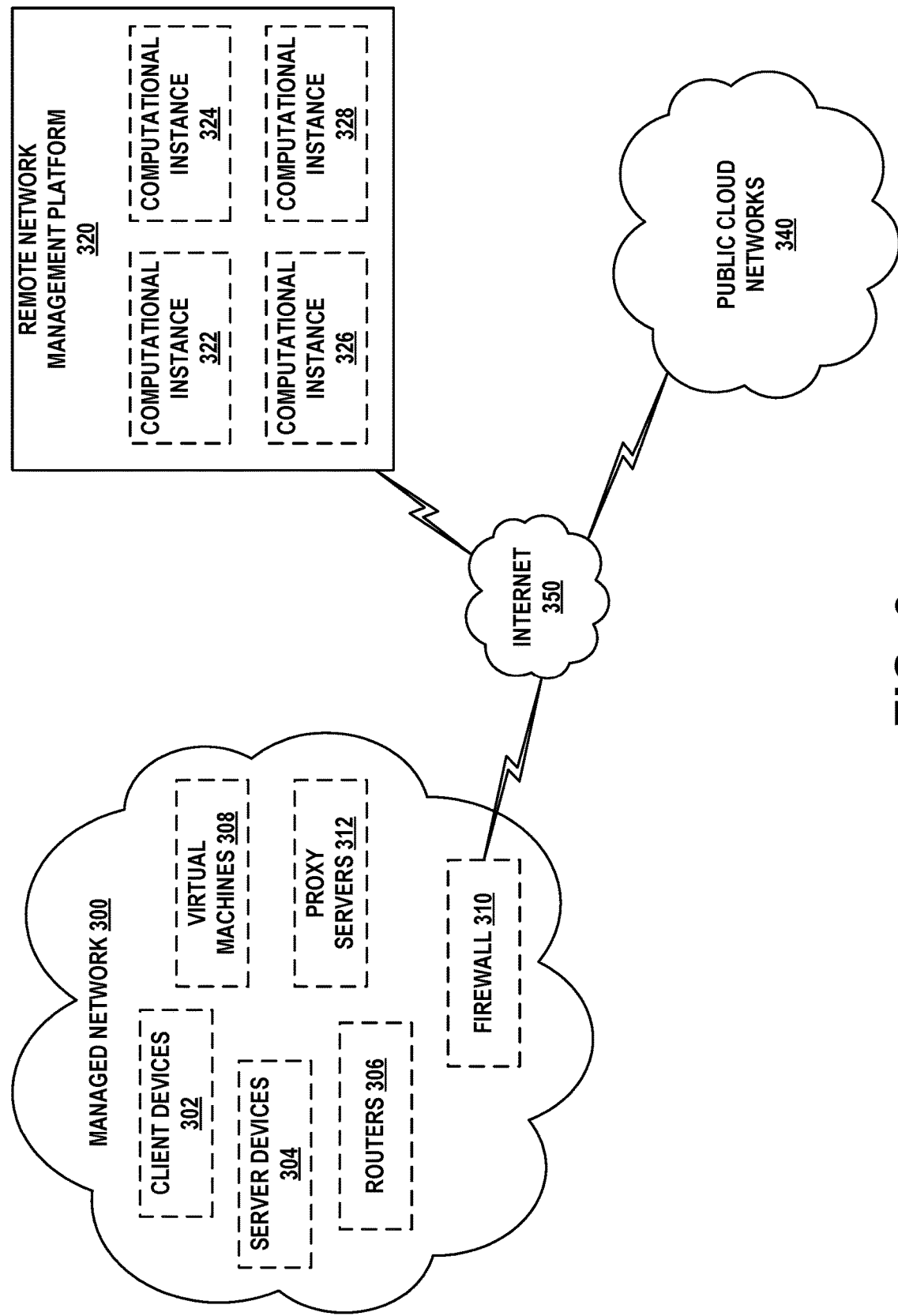
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
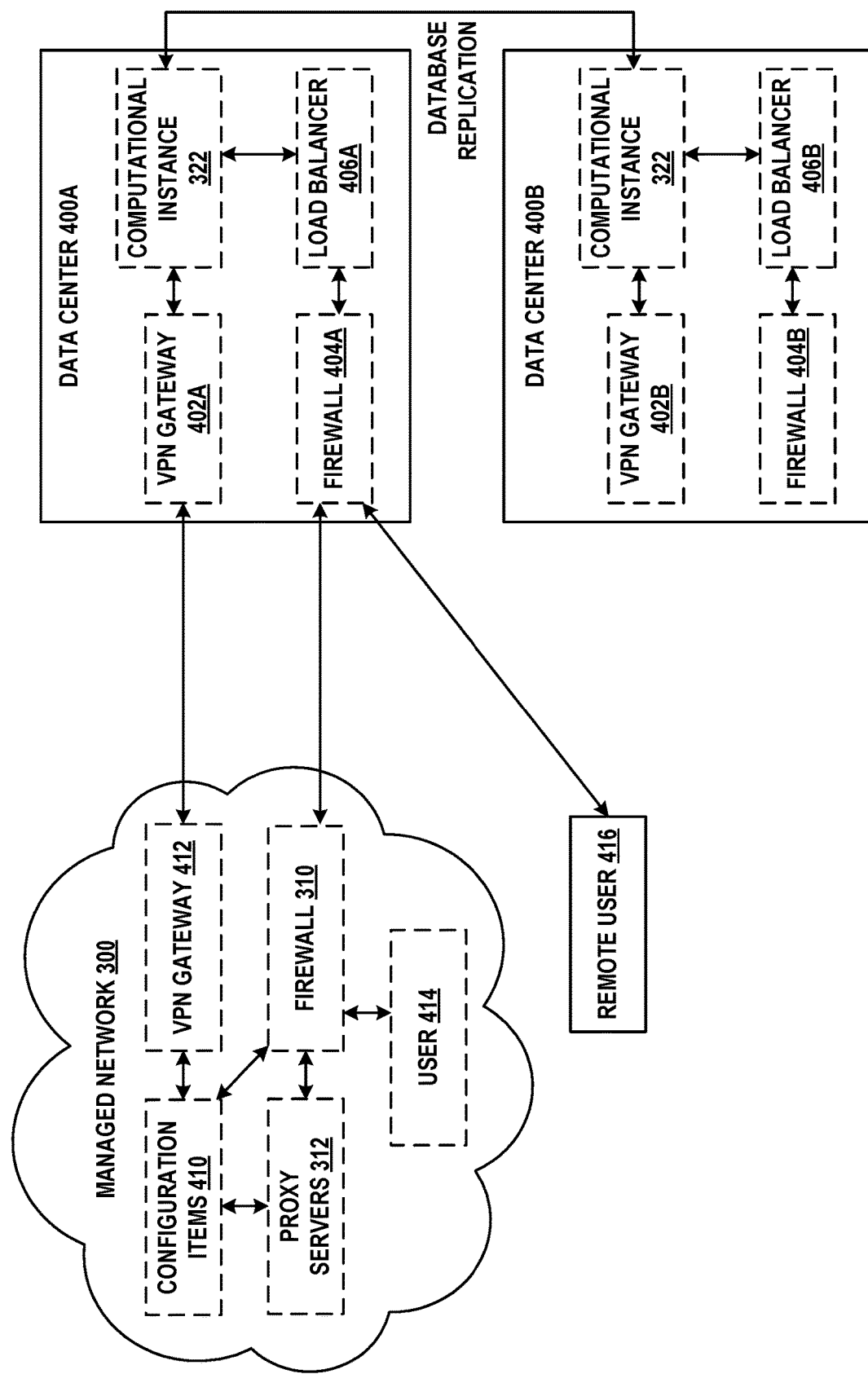
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
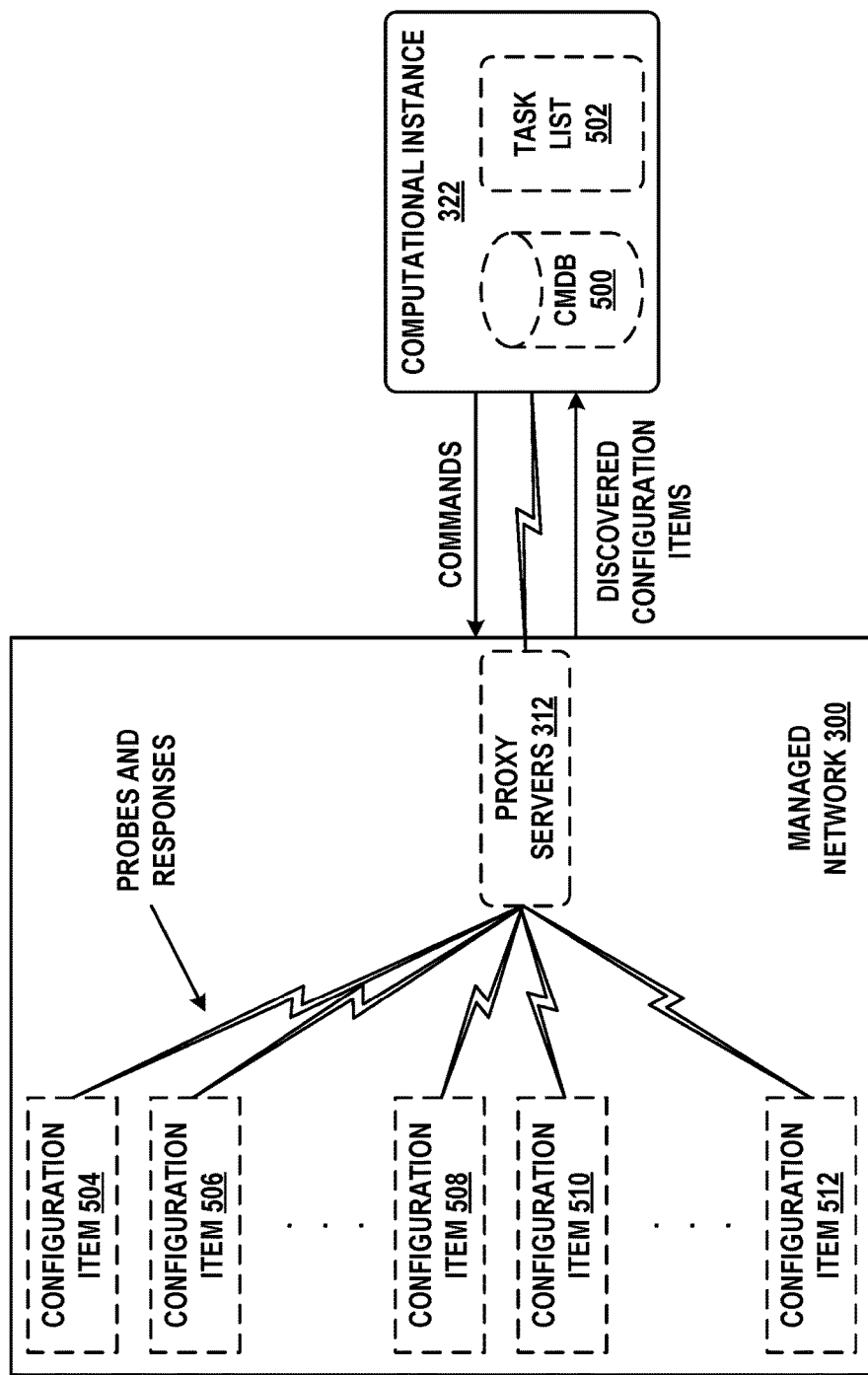
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address (es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
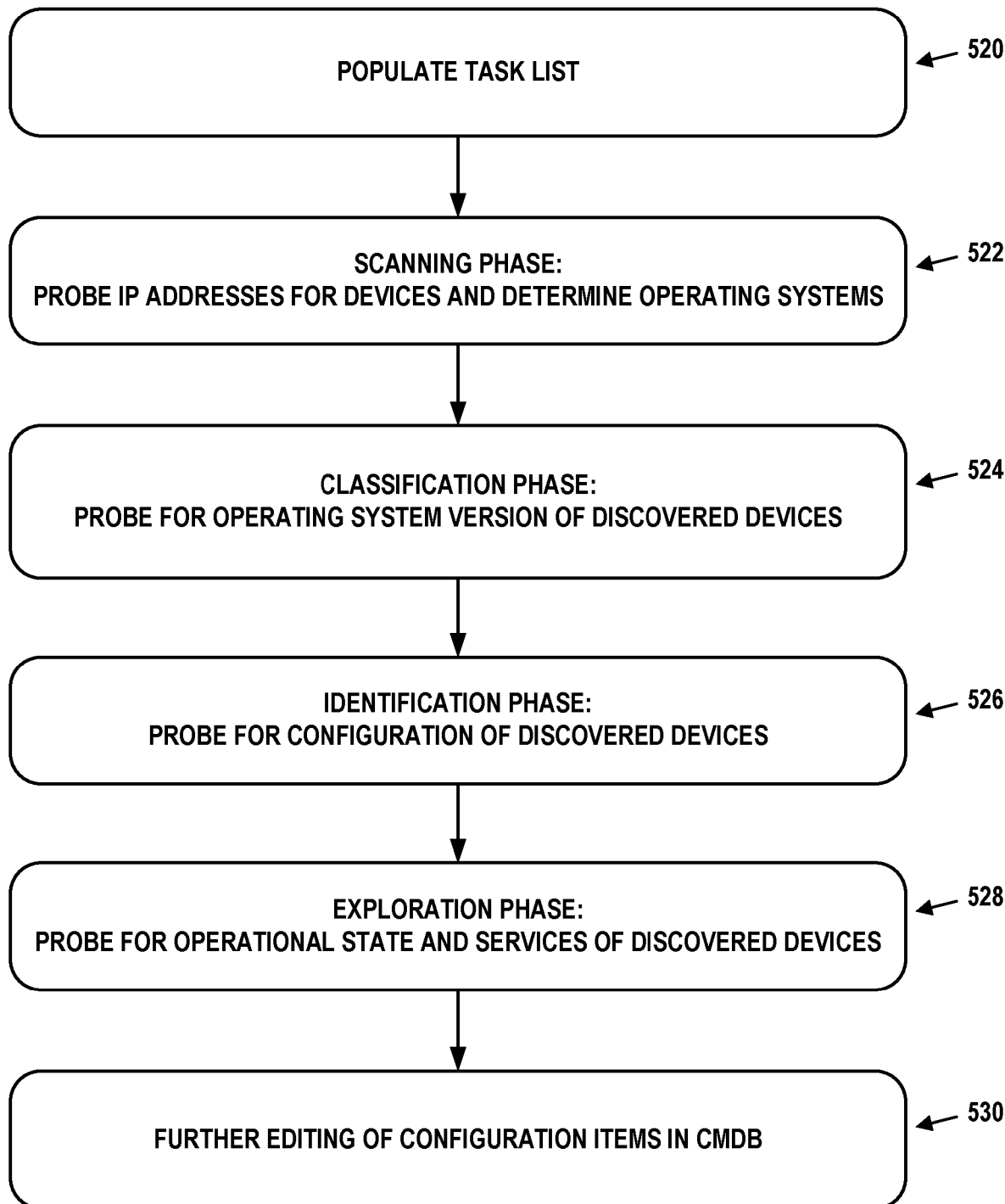
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. CMDB Identification Rules and Reconciliation

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication

VI. Discovering and Representing Implicit Configuration Items in a CMDB

Existing automated discovery procedures may not be able to detect and/or identify all software disposed upon a managed network. Some of these procedures may only discover executing applications (e.g., by obtaining a list of such by way of a command line interface). Other procedures may able to discover executable applications that are present on a computing device but not necessarily executing (e.g., by searching for executable files in particular locations of a file system). But applications may exist in non-executable forms as well. Discovery of these forms and the proper representation thereof in a CMDB is not presently supported.

Nonetheless, facilitating such discovery can be beneficial. At any given point in time, the managed network may be in the process of developing one or more custom applications. Thus, the custom applications may exist largely as source code. For the purposes herein, source code may include software written using a human-readable programming language (e.g., C++, JAVA, JAVASCRIPT®, Python, HTML, etc.), as well as associated configuration, build, and/or resource files. The source code is typically stored in text files, while the configuration, build, and resource files could be either in text files or binary fields (e.g., resource files often contain still images, audio, and/or video). A custom application may consist of one or more source code files.

These custom applications may be undeployed, in that they do not have corresponding compiled or executable files disposed upon the managed network or elsewhere. For instance, a custom application that is under development may exist only in source code form. In such a case, the source code may be stored in the managed network, but corresponding executable variations of the application might not exist or be deployed for use. Herein, an application that is deployed is assumed to be compiled or otherwise in an executable form and installed on at least one computing device in the managed network or on a public cloud network.

On the other hand, compiled or executable files corresponding to one or more versions of these applications might be disposed upon the managed network or a public cloud network. As an example, source code for versions 1.0 and 1.1 of a custom application may be stored in the managed network, but a compiled representation of only version 1.0 might be deployed. Thus, version 1.1 of the application may exist only in source code form. Examples include word processing and/or email applications installed upon client devices, where these client devices may be associated with the managed network but not always disposed upon the managed network (e.g., laptops).

As noted, traditional discovery procedures cannot discover versions of applications that exist only as source code. Further, even if the source code were discoverable or were somehow entered into an existing configuration item table in the CMDB, such an arrangement would be problematic. The managed network relies upon the CMDB to be a single source of truth with respect to applications that are deployed for use upon the managed network or a public cloud network. Including representations of source code in the CMDB as normal configuration items would result in the CMDB no longer containing an accurate representation of applications that are actually in use or usable by the managed network. Thus, remote network management platform applications would not be able to distinguish between deployed and undeployed applications.

In such a situation, some remote network management platform applications would generate invalid interpretations of the configuration items. For example, a vulnerability response application that scans source code and/or executable files for security vulnerabilities may flag the source code for a custom application as having one or more vulnerabilities. But, if this application is not deployed, the effective security risk is negligible. Such an inaccuracy could cause IT professionals to waste time tracking down and trying to address a false positive.

Similarly, remote network management platform applications for service mapping may generate representations of services that span one or more configuration items. Such an application might erroneously include an undeployed custom application in its representation of a service. For example, the undeployed custom application may include, for purposes of testing, parameters in its source code (e.g., IP addresses, names of other applications, a name of the service) linking it to other configuration items in the service. But the resulting service map would not be an accurate representation of which configuration items are actively involved in providing the service. Thus, IT professionals might become confused, and waste time searching for or investigating configuration items that do not actually exist as active components of the service.

To overcome these limitations, the embodiments herein introduce a new type of configuration item to represent source code—the implicit configuration item. Unlike previous configuration items (which can be referred to as explicit configuration items for purposes of differentiation), an implicit configuration item represents a source code version of a software application that may be uncompiled, undeployed, or under development.

An implicit configuration item may represent one or more source code files stored in a source code repository, for example. Such an implicit configuration item may include some or all attributes of a traditional configuration item, as well as an application name, application version, an indication of whether the compiled application is intended to be Internet-facing, the type of compiled application (e.g., web service, microservice, etc.), and so on.

A. Implicit and Explicit Configuration Item Storage

Implicit configuration items may exist in a CMDB table that is separate from those used to store explicit configuration items. Thus, implicit configuration items can easily be distinguished from explicit configuration items and would not be subject to operations occurring on tables of explicit configuration items. This new CMDB table may inherent some or all of the attributes and properties of a base configuration item table in the CMDB.

In addition to this new table storing implicit configuration items, a further CMDB table may be defined to store named or unnamed relationships between implicit configuration items and other configuration items (e.g., between two implicit configuration items, or between one implicit configuration item and one explicit configuration item). This further relationship table may be referred to as an implicit relationship table, and may be separate from any existing explicit relationship tables that define explicit relationships between pairs of explicit configuration items.

Figure 6:
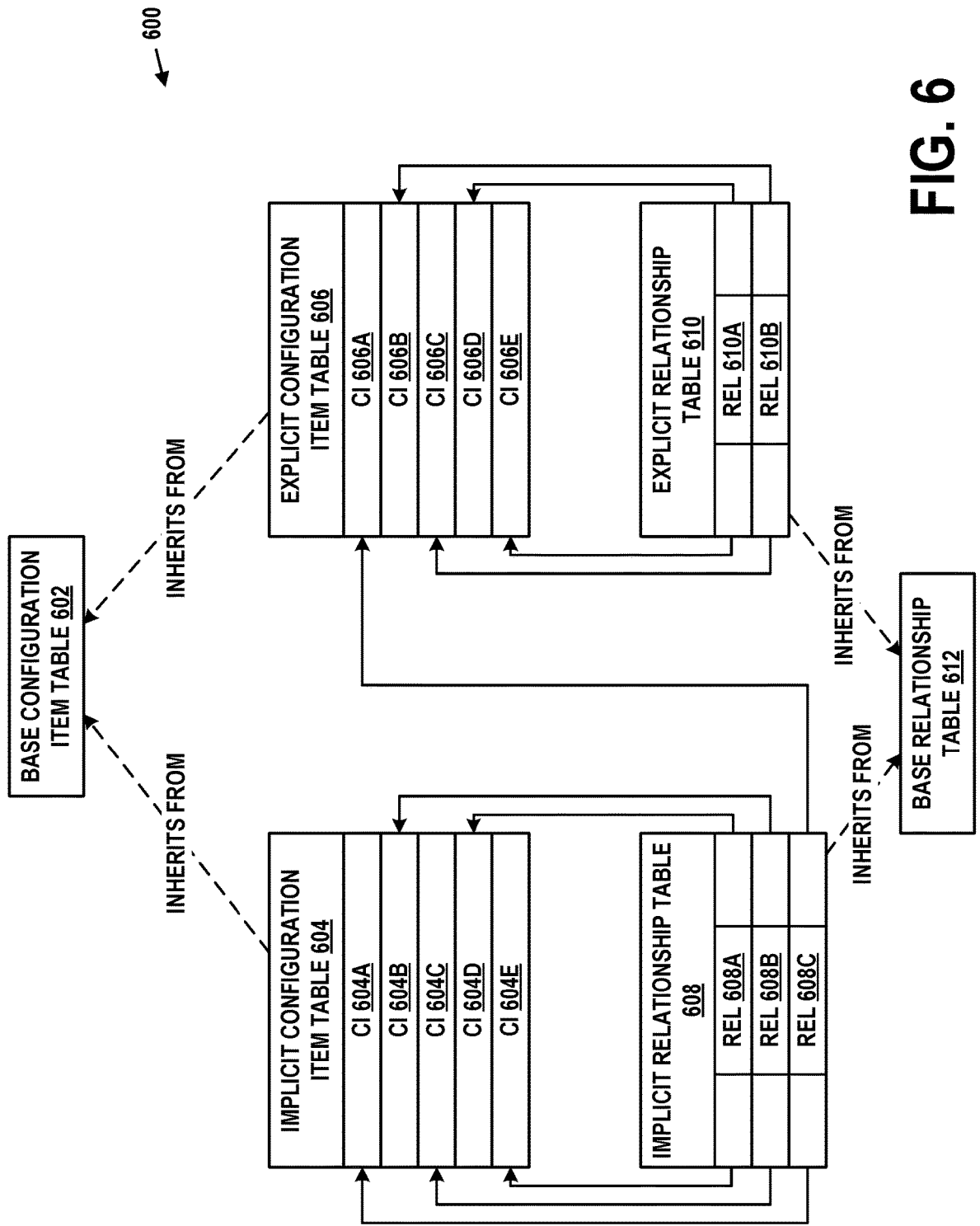
FIG. 6 depicts an arrangement of database tables, in accordance with example embodiments.

These tables and how they may be used are defined in database architecture 600 of FIG. 6. Particularly, database architecture 600 may exist in the CMDB and include base configuration item table 602, which defines some number of attributes. These attributes (not shown) may appear as columns in base configuration item table 602. Example attributes include: to whom the configuration item is assigned, a department of the managed network that owns or uses the configuration item, how the configuration item was discovered, an IP address of the configuration item, a link-layer address of the configuration item, the time at which the configuration item was most recently discovered, a model number of the configuration item, a serial number of the configuration item, a class of the configuration item, a unique identifier of the configuration item, and a vendor that provided the configuration item. Other attributes are possible, and some embodiments include several dozen attributes in the configuration item table. In some cases, not all of these attributes will be populated with values for all configuration items, and unpopulated attributes may take on a null, blank, or default value.

Implicit configuration item table 604 and explicit configuration item table 606 inherit from base configuration item table 602. In other words, implicit configuration item table 604 and explicit configuration item table 606 may contain all of the attributes in base configuration item table 602, and additional attributes as well. Further, while only one instance of each of implicit configuration item table 604 and explicit configuration item table 606 are shown, multiple instances of these tables may be present. For example, there may be several tables each containing different types of implicit configuration items and/or several tables each containing different types of explicit configuration items. Thus, there may be explicit configuration item tables for generic hardware components, generic software components, hardware components from particular vendors, software components from particular vendors, and so on. Accordingly, implicit configuration item table 604 may represent one of possibly many such tables containing implicit configuration items, and explicit configuration item table 606 may represent one of possibly many such tables containing explicit configuration items.

Implicit configuration item table 604 as shown contains five implicit configuration items, 604A, 604B, 604C, 604D, and 604E. As noted above, each of these implicit configuration items may represent a set of source code files. Explicit configuration item table 606 as shown contains five explicit configuration items, 606A, 606B, 606C, 606D, and 606E. As noted above, each of these explicit configuration items may represent a hardware component or executable software component.

Implicit relationship table 608 contains relationships between pairs of configuration items. As noted above, implicit relationship table 608 may contain relationships between pairs of implicit configuration items or between an implicit configuration item and an explicit configuration item. In some embodiments, implicit relationship table 608 does not contain relationships between pairs of explicit configuration items. Thus, for example, relationship 608A is between implicit configuration items 604D and 604E, while relationship 608B is between implicit configuration items 604B and 604C. Relationship 608C, on the other hand, is between implicit configuration item 604A and explicit configuration item 606A.

Explicit relationship table 610 might only contain relationships between pairs of explicit configuration items. Thus, for example, relationship 610A is between explicit configuration items 606D and 606E, while relationship 610B is between explicit configuration items 606B and 606C.

Relationships in implicit relationship table 608 and explicit relationship table 610 may contain references "pointing" to configuration items. These references are shown as solid arrows from entries in implicit relationship table 608 or explicit relationship table 610 to specific configuration items. In practice, a reference be implemented as a numeric value referring to a unique identifier of a configuration item in one of configuration item table 604 or explicit configuration item table 606. But other possibilities exist.

The relationships in implicit relationship table 608 may either be named or unnamed. A named relationship includes an indication of the type of relationship, e.g., "is hosted on", "runs on", "depends on", or "is used by". An unnamed relationship indicates that a relationship exists between two configuration items but does not specify the type of relationship. The relationships in explicit relationship table 610 may all be named.

In some embodiments, implicit relationship table 608 and explicit relationship table 610 may inherit from base relationship table 612. Thus, base relationship table 612 may define a relationship entry to include a per-table unique identifier, references to two configuration items, a type, and possibly other attributes. Entries in implicit relationship table 608 and explicit relationship table 610 may include these attributes and possibly other attributes as well. For example, implicit relationship table 608 may contain attributes not in explicit relationship table 610, and/or vice versa.

B. Discovering Source Code Repositories

Most source code under development is stored in a source code repository. Such a repository may include a database and/or file system including the source code files.

The source code repository may perform version control over the source code files by tracking changes to these files as well as allowing each variation thereof to be tagged with a version number (i.e., a file version). Various tagged versions of source code files, when compiled into machine code, byte code, or some other executable or interpretable format, may result in a particular version of an application (i.e., an application version).

The source code repository may have a web-based interface for interacting with the source code files. By way of this interface, a software developer may be able to browse directories of files, view files, check files out, check files in, merge different versions of files, resolve conflicts between different versions of files, compile versions of applications from these files, create forks or branches of applications, and possibly perform other tasks. Other interfaces providing this functionality (e.g., from a dedicated client application) may also exist. Additional source code repository features may include defect tracking, task management, editing of documentation files, and continuous build, integration, and test, as well as user-defined properties.

Figure 7A:
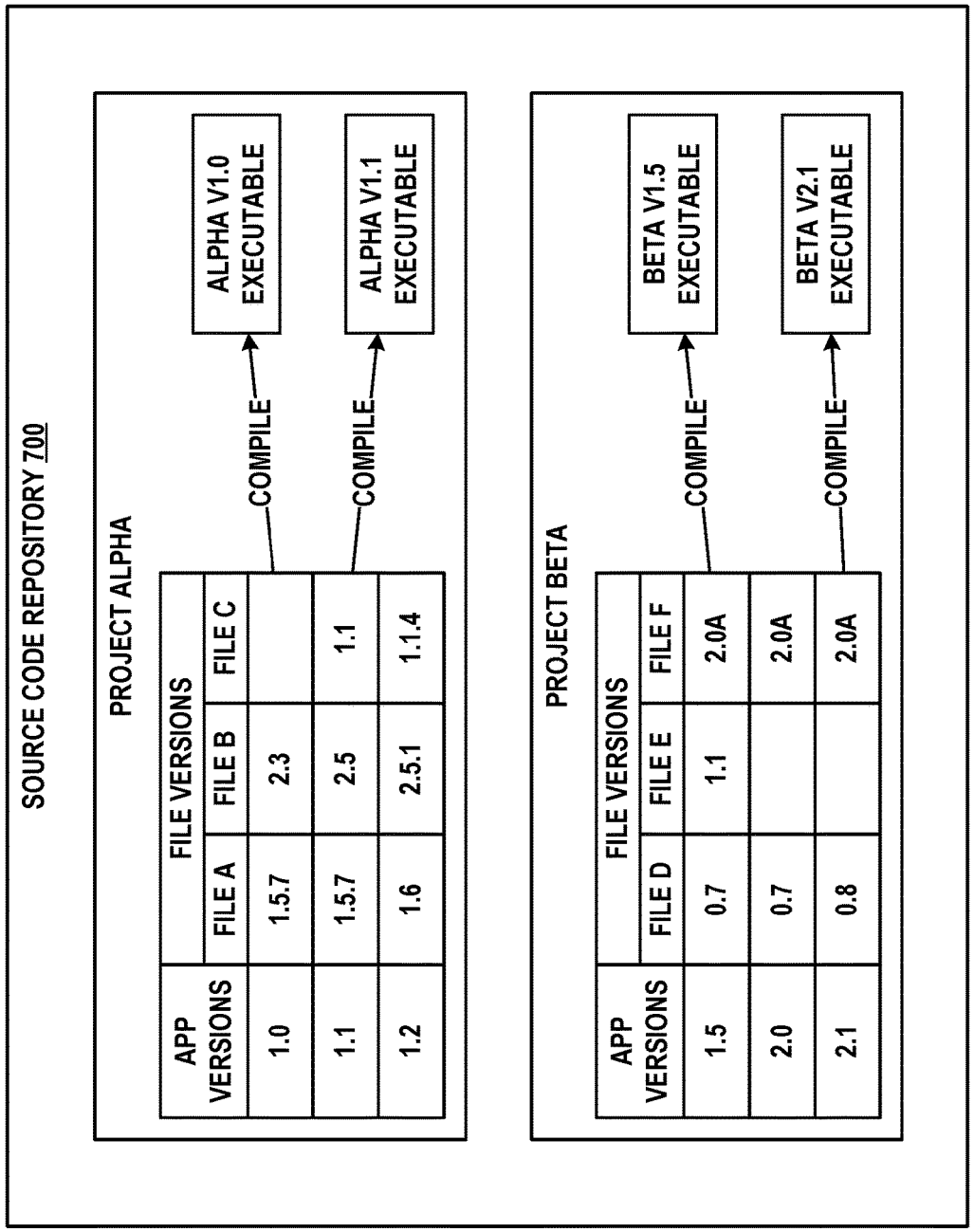
FIG. 7A depicts the contents of a source code repository, in accordance with example embodiments.

FIG. 7A is a depiction of source code repository 700, containing two projects, alpha and beta that correspond to respective applications. Each of these projects includes multiple source code files tagged with file versions, and application versions that consist of a number of tagged file versions. Each file version may represent a version of the source code file that was checked into source code repository 700, and each application version may represent a set of file versions of the source code files that can be (or is intended to be) compiled into an executable application or accompany such an executable application. While only two projects are shown in FIG. 7A, many such projects may exist in source code repository 700.

Project alpha includes source code files A, B, and C. Multiple file versions of these files may be stored in source code repository 700, each with a specific and unique tag. For example, there are two file versions of source code file A (1.5.7 and 1.6), three file versions of source code file B (2.3, 2.5, and 2.5.1), and two file versions of source code file C (1.1 and 1.1.4). There are also three application versions of project alpha. Application version 1.0 includes file versions 1.5.7 and 2.3 of source code files A and B, respectively. Application version 1.1 includes file versions 1.5.7, 2.5, and 1.1 of source code files A, B, and C, respectively. Application version 1.2 includes file versions 1.6, 2.5.1, and 1.1.4 of source code files A, B, and C, respectively. Notably, more or less than three source code files may exist in a project, and more or fewer file versions and application versions may also exist. Also, different application versions of the same application may involve different numbers of source code files.

FIG. 7A also shows that application version 1.0 of project alpha (consisting of file versions 1.5.7 and 2.3 of source code files A and B, respectively) has been compiled into version 1.0 of the project alpha executable. Also, application version 1.1 of project alpha (consisting of file versions 1.5.7, 2.5, and 1.1 of source code files A, B, and C, respectively) has been compiled into version 1.1 of the project alpha executable. These compiled executables can be distributed for installation on computing devices within the managed network or elsewhere. Application version 1.2 has not yet been compiled into an executable. This may be because the associated file versions of source code files A, B, and C are still under development.

Similarly, project beta includes source code files D, E, and F. Not unlike the source code files of project alpha, multiple file versions of these files may be stored in source code repository 700, each with a specific and unique tag. For example, there are two file versions of source code file D (0.7 and 0.8), one file version of source code file E (1.1), and one file version of source code file F (2.0A). There are also three application versions of project beta. Application version 1.5 includes file versions 0.7, 1.1, and 2.0A of source code files D, E, and F, respectively. Application version 2.0 includes file versions 0.7 and 2.0A of source code files D and F, respectively. Application version 2.1 includes file versions 0.8 and 2.0A of source code files D and F, respectively.

FIG. 7A also shows that application version 1.5 of project beta (consisting of file versions 0.7, 1.1, and 2.0A of source code files D, E, and F, respectively) has been compiled into version 1.5 of the project beta executable. Also, application version 2.1 of project beta (consisting of file versions 0.8 and 2.0A of source code files D and F, respectively) has been compiled into version 2.1 of the project beta executable. These compiled executables can be distributed for installation on computing devices within the managed network or elsewhere. Application version 2.0 has not yet been compiled into an executable. This may be because the associated file versions of source code files D and F are still under development, or compilation of this version of project beta has been put aside in favor of version 2.1.

As noted, a source code repository can be logged into, e.g., by way of a web interface or a client application. This means that, given the proper credentials (e.g., userid and password), proxy servers 312 can access source code repository 700 and use commands to view projects and the source code files thereof. As an example, proxy server 312 may access source code repository 700, request a list of projects, and receive indications that project alpha and project beta are stored within source code repository 700.

Then, proxy server 312 may perform commands to select project alpha, and obtain a listing of the versions of this project. If possible, proxy server 312 may also obtain information about the associated executable files, such as their file names and whether they are intended to be Internet-facing (e.g., directly accessible by way of a public IP address on the Internet). Proxy server 312 may collect similar information with regard to project beta. Proxy server 312 may also provide this information to a CMDB (e.g., CMDB 500) for storage in a table that stores implicit configuration items (e.g., implicit configuration item table 604). The entries stored in the table may respectively include each project's name, version, a unique identifier, whether it is intended to produce Internet-facing applications, and possibly other information as well. In some cases, this additional information may include indications of source code files associated with each version of the project, whether the project has been tested, individuals responsible for the project, and a status of the project.

While projects within source code repositories can be automatically discovered using such a process, some managed networks may manually enter this data into the CMDB, or may use manual entry of data to enhance what is found during discovery. Also, as discussed below, remote network management platform applications other than those focused on discovery may populate the CMDB with information related to implicit configuration items.

C. Determining Implicit Relationships Between Source Code and Applications

Figure 7B:
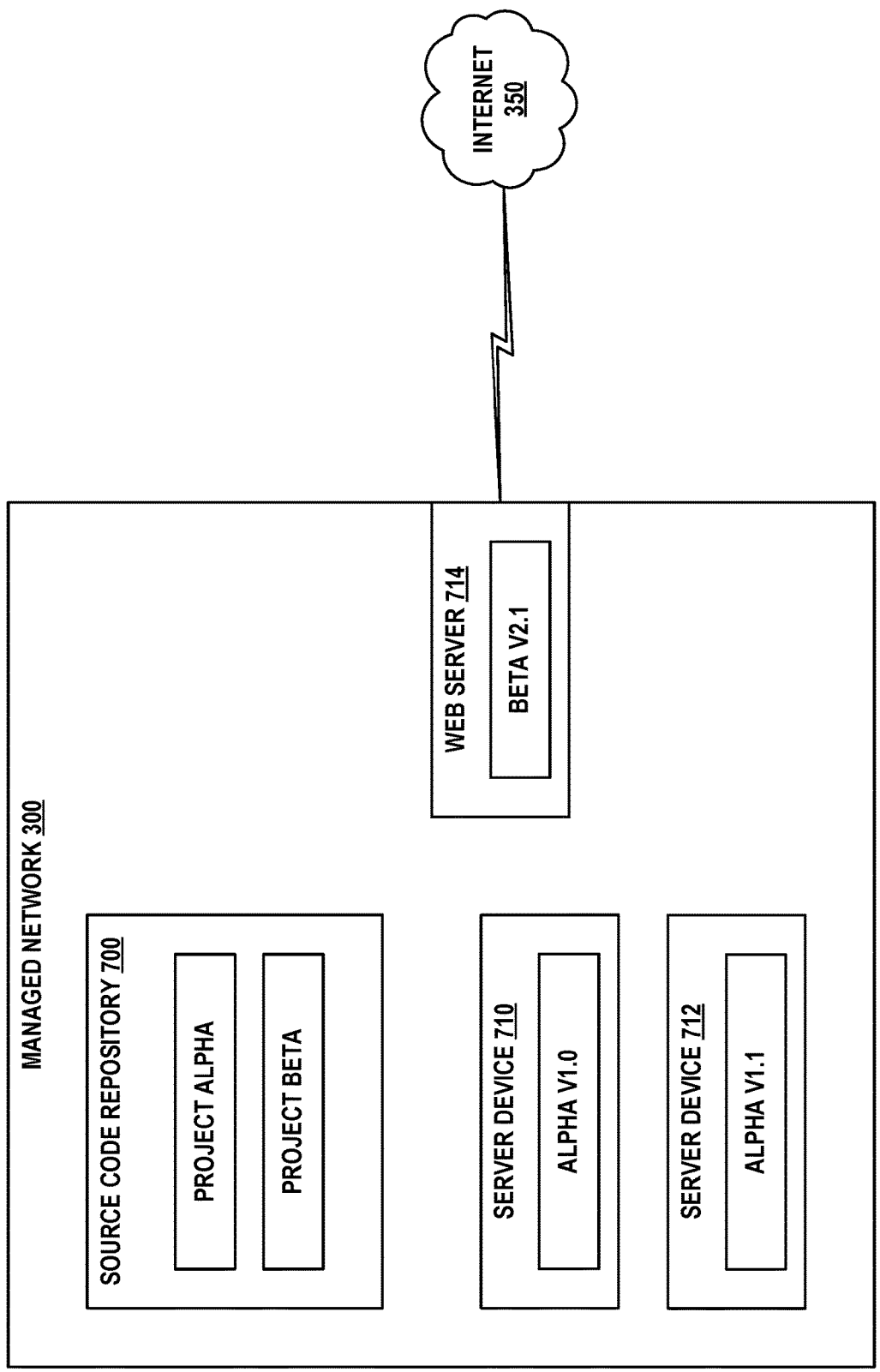
FIG. 7B depicts applications developed and deployed on a managed network in accordance with example embodiments.

FIG. 7B depicts managed network 300 containing source code repository 700, server device 710, server device 712, and web server 714. As shown in FIG. 7A, source code repository contains the source code and related information from project alpha and project beta. Server device 710 has deployed upon it version 1.0 of the project alpha executable, and server device 712 has deployed upon it version 1.1 of the project alpha executable. Web server 714 has deployed upon it version 2.1 of the project beta executable. As shown, the project beta executable on web server 714 is Internet-facing while the two project alpha deployments are not.

Given the information discoverable within source code repository 700, server device 710, server device 712, and web server 714, tables in the CMDB containing implicit configuration items, explicit configuration items, and implicit relationships may be populated. For example, implicit configuration item table 604 may be populated with entries for each version of project alpha and project beta, and explicit configuration item table 606 may be populated with each deployment of the project alpha and project beta executables. In some cases, relationships between the source code and the deployed executables may be determined (e.g., based on the filenames and versions of the project alpha and project beta executables, and/or other identifying information). Thus, implicit relationship table 608 can be populated with entries that associate versions of projects in source code repository 700 (represented as configuration items in implicit configuration item table 604) with their respective deployed executables (represented as configuration items in explicit configuration item table 606).

In some embodiments, one or more of source code repository 700, server device 710, server device 712, and web server 714 may exist outside of the managed network, such as in one or more of public cloud networks 340. In these cases, source code repository 700 and its compiled applications executing on server device 710, server device 712, and web server 714 may be discoverable by way of application programming interfaces of the public cloud network in which these devices are disposed.

VII. Implicit Configuration Item Use

Once stored in a CMDB, implicit configuration items and implicit relationships can be used by various remote network management platform applications. Three such remote network management platform applications are described herein—vulnerability response, development operations, and application portfolio management. Each of these applications may employ functionality that can be used to populate the CMDB with implicit configuration items and/or implicit relationships. Each application may also be able to read and integrate these implicit configuration items and/or implicit relationships into their operations.

Figure 8:
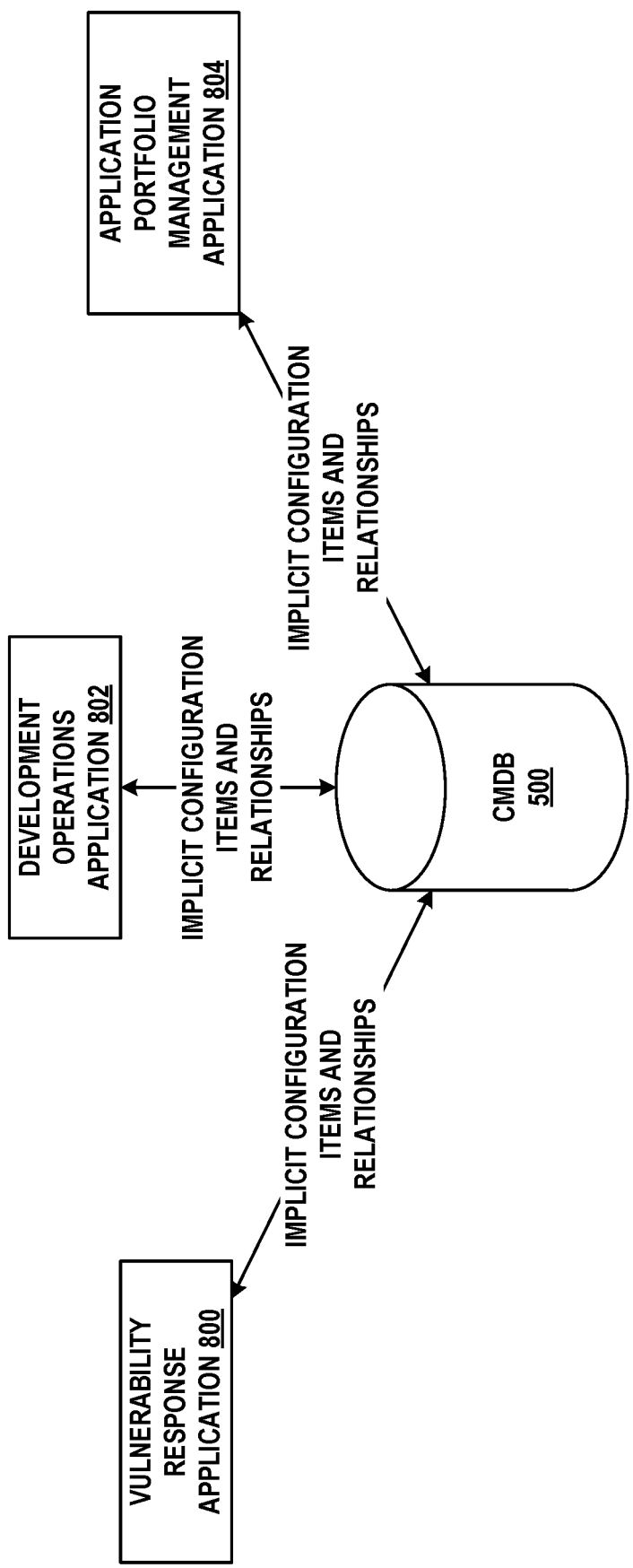
FIG. 8 depicts remote network management platform applications using implicit configuration items and relationships, in accordance with example embodiments.

FIG. 8 illustrates a remote network management platform architecture to facilitate these features. As previously described, CMDB 500 is disposed within a remote network management platform, and the platform supports a number of remote network management platform applications. Vulnerability response application 800, development operations application 802, and application portfolio management application 804 may each be able to write to and/or read from CMDB 500. Particularly, these three applications may be able to populate, edit, and read from implicit configuration item table 604 and implicit relationship table 608. The applications may also be able to populate, edit, and read from explicit configuration item table 606 and explicit relationship table 610.

In some cases, these applications may communicate with proxy server 312 or discovery applications on the remote network management platform to cause discovery of implicit configuration items. In other cases, software disposed on the managed network or a public cloud network may provide information related to implicit configuration items to the CMDB.

Any implicit configuration items or implicit relationships stored in CMDB 500 due to the activities of one remote network management platform application may be used by any other remote network management platform application. For example, implicit configuration items discovered at the request of vulnerability response application 800 may be used by development operations application 802.

The disclosure below provides more detail as to the operations of vulnerability response application 800, development operations application 802, and application portfolio management application 804, and also illustrate some scenarios in which use of implicit configuration items can enhance the functionality of these applications.

Figure 9:
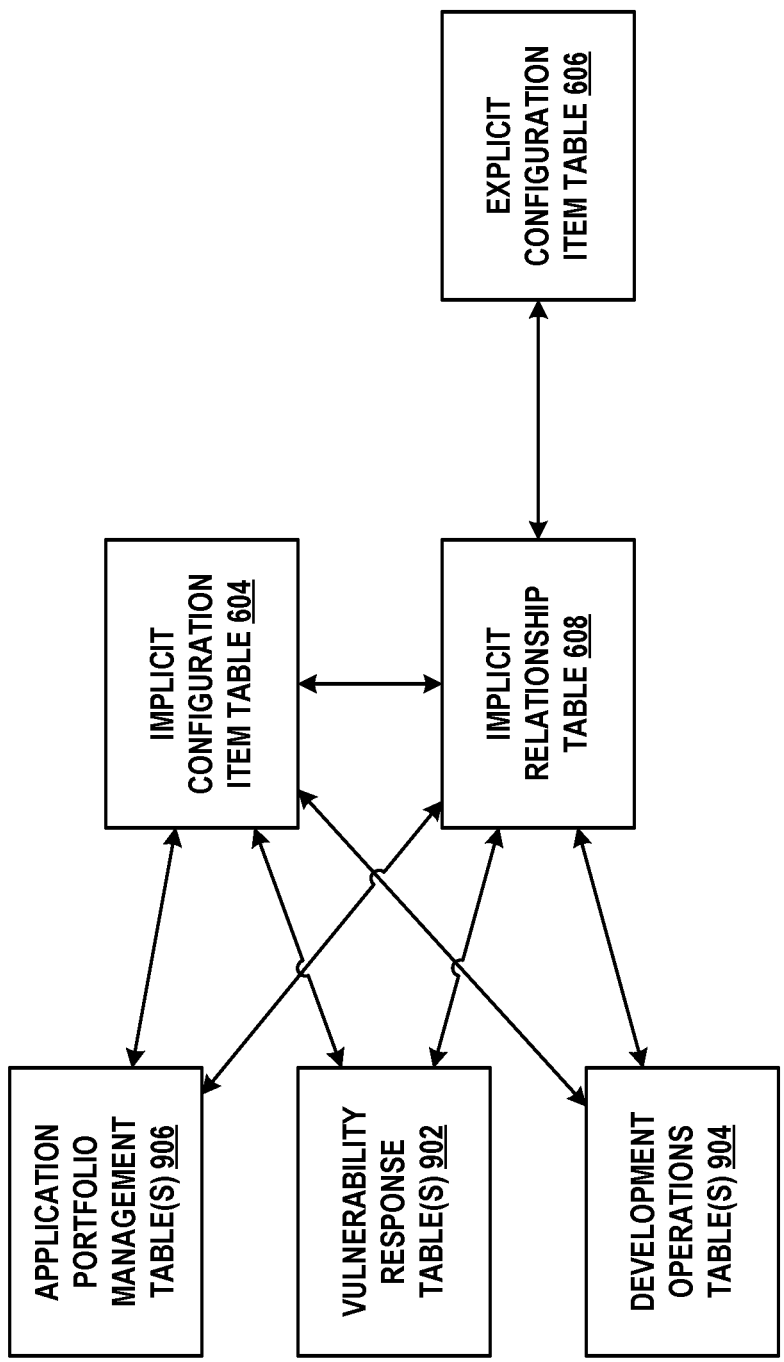
FIG. 9 depicts a further arrangement of database tables, in accordance with example embodiments.

As shown in FIG. 9, the role of implicit relationship table 608 may be expanded to incorporate relationships between implicit configuration items stored in implicit configuration item table 604, explicit configuration items stored in explicit configuration item table 606, entries from vulnerability response application 800 stored in vulnerability response table(s) 902, entries from development operations application 802 stored in development operations table(s) 904, and/or application portfolio management application 804 stored in application portfolio management table(s) 906. In various embodiments, not all of these tables may be present.

As an example, in some cases, vulnerability response application 800, development operations application 802, and application portfolio management application 804 may each read from and write to implicit configuration item table 604 without needing the presence of implicit relationship table 608 or explicit configuration item table 606. This may be due to entries in implicit relationship table 608 and explicit configuration item table 606 not yet existing because the software development is too early in the process to commit hardware resources as explicit relationships. Or, if the source code does not run on managed network hardware, then there may not ever be a relationship to other configuration items.

A. Vulnerability Response

Vulnerabilities may relate to known or discovered defects in software disposed upon or associated with a managed network. Exploitation of a vulnerability may result in a negative impact to the data confidentiality, integrity, and/or availability of one or more applications or computing devices. It should be noted that vulnerabilities are not the same as active security threats—vulnerabilities may harmlessly exist in an unexploited state while active security threats are ongoing attacks that need immediate mitigation.

Vulnerabilities may be associated with different severities. For example, a first hypothetical vulnerability may be that opening a certain type of file in a word processing application provides a remotely-exploitable mechanism through which an attacker can gain access to the computing device on which the word processing application is installed. This would likely be viewed a critical vulnerability, as it could lead to unauthorized access to confidential data. On the other hand, a second hypothetical vulnerability may be that providing certain input to a web browsing application may cause the screen of the computing device on which the web browsing application is installed to go blank. This would likely be viewed as a non-critical vulnerability, as it is a mere annoyance to the user. Severity may be chosen, for example, on a spectrum from critical (most severe), to high, to medium, to low (least severe).

Vulnerabilities can be found based on static or dynamic scanning of applications, or based on published lists of known vulnerabilities in particular versions of applications. Vulnerability response may use any combination of these sources to identify and manage vulnerabilities.

A static scan may parse the source code of an application, searching for indications of vulnerabilities. Techniques employed may include abstract interpretation (modeling the impact each statement of code has on a hypothetical machine that would execute the code), data flow analysis (modeling paths through the code as a lattice), formal systems (rules that reason about the correctness of programs), and symbolic execution (a system of mathematical expressions that represent the values of variables in various points in the code). Other less formal techniques may scan the source code for hardcoded passwords, unused variables, unchecked boundaries, and so on.

Dynamic scanning generally involves analysis of applications while they are executing. Dynamic scanning tool may execute an application in a safe (e.g., sandboxed) environment with a broad array in inputs. The tool may attempt to detect memory errors (e.g., memory leaks, uncheck boundaries), locate defects in the code (fault localization), determine whether race conditions exist, and so on.

Listings of known vulnerabilities are published by governments, as well as various commercial entities. For example, the U.S. National Institute of Standards and Technology (NIST) maintains a public national vulnerability database, listing known vulnerabilities, their severities, and their exploitability (e.g., how an attacker might go about using the vulnerability and how hard this process might be).

Given the intractability of manually detecting vulnerabilities, a number of software tools are available that perform automated vulnerability detection. Some of these tools include, but are not limited to, NESSUS®, QUALYSGUARD®, and RAPID7®. For purposes of simplicity, various vulnerability detection and assessment tools are referred to as third-party vulnerability detection tools or vulnerability scanners in the discussion below. In some cases, these tools may execute on one or more computing devices of the managed network, scanning the software configurations of these devices, or remotely scanning the software configurations of other devices on the managed network. Results of these scans may be made available to the remote network management platform, either directly or by way of a public cloud network, and stored in the CMDB.

These results may be in the form of implicit configuration items written directly to implicit configuration item table 604 or in some other form that is written to vulnerability response table(s) 902. In the former case, the remote network management platform may execute a reconciliation routine to populate implicit relationship table 608 with entries between these new implicit configuration items and those in explicit configuration item table 606. For example, a relationship may be added to implicit relationship table 608 between an implicit configuration item and an explicit configuration item when the two have an application name, application version, application identifier, and/or some other identifying data in common.

In the latter case, the remote network management platform may execute an initial reconciliation routine to populate implicit configuration item table 604 with entries based on those in vulnerability response table(s) 902. For example, entries in vulnerability response table(s) 902 referencing source code of applications may be used to form implicit configuration items representing that source code. Then, the remote network management platform may execute further reconciliation routines to populate implicit relationship table 608 with entries between these new implicit configuration items and the entries in vulnerability response table(s) 902, as well as between these new implicit configuration items and those in explicit configuration item table 606. In some cases, relationships between any of implicit configuration item table 604, configuration item table 606, vulnerability response table(s) 902, development operations table(s) 904, and/or application portfolio management table(s) 906 may also be populated in implicit relationship table 608.

B. Development Operations

A development operations application on a remote network management platform collects data related to the software application development cycle (plan, develop, build, test, deploy, operate) of applications under development within a managed network or public cloud environment. To do so, the development operations application connects to or integrates with multiple tools that in the development toolchain. The resulting data can be processed to generate automated change requests, generate visualizations of project progress, and integrate with external (third-party) development operations tools.

The visualizations include representations of development activities, source code check-ins, deployments, change management, and system health. These representations provide and end-to-end view of the entire software development process and can be used to identify specific areas that need attention. For example, if the number of source code check-ins are trending low, this may mean that larger, more risky changes are being made to the source code. Additionally, if change approval delays are trending high, this may indicate that there is too much reliance on manual approvals.

Some or all of the information used by development operations may be stored in one or more tables of a CMDB, such as development operations table(s) 904. The remote network management platform may execute a reconciliation routine to populate implicit configuration item table 604 with entries based on those in development operations table(s) 904. For example, entries in development operations table(s) 904 referencing to source code of applications may be used to form implicit configuration items representing that source code. Then, the remote network management platform may execute further reconciliation routines to populate implicit relationship table 608 with entries between these new implicit configuration items and the entries in development operations table(s) 904, as well as between these new implicit configuration items and those in explicit configuration item table 606. In some cases, relationships between any of implicit configuration item table 604, configuration item table 606, vulnerability response table(s) 902, development operations table(s) 904, and/or application portfolio management table(s) 906 may also be populated in implicit relationship table 608.

C. Application Portfolio Management

An application portfolio management application on a remote network management platform may classify applications deployed on a managed network by services provided or functionality. The classification procedures may be performed based on explicit configuration items (e.g., stored in explicit configuration item table 606) that have been discovered automatically or manually entered, as well as any service maps developed therefrom. The classification may include the name and version of the application, and indication of its functionality, and possibly other information, such as annual cost. For instance, application portfolio management may classify discovered executable applications based on their respective vendor names, application names, and/or version numbers into such categories.

As an example of the utility of application portfolio management, a large managed network may have inadvertently licensed and deployed two different productivity software suites to its employee's client devices. For example, client devices at one location may have one of these suites installed and another location may have the other installed. Application portfolio management may help the managed network determine that this is the case, the extent of each deployment, and the possible savings that could be gained if these two suites were consolidated into just one.

Further, application portfolio management may identify lifecycles and licensing statuses of the software applications that that make up services associated with the managed network. From this data, application portfolio management can notify the managed network when lifecycles or licenses for certain applications are about to expire or need renewal, thereby reducing risk of service disruption.

Application portfolio management may generate its data from entries in explicit configuration item table 606, for example. Then, it may store this data in application portfolio management table(s) 906. Application portfolio management may also obtain (e.g., via discovery or manual configuration) information related to implicit configuration items and then store this information in implicit configuration item table 604.

Then, the remote network management platform may execute reconciliation routines to populate implicit relationship table 608 with entries between these implicit configuration items and the entries in application portfolio management table(s) 906, as well as between these implicit configuration items and those in explicit configuration item table 606. In some cases, relationships between any of implicit configuration item table 604, configuration item table 606, vulnerability response table(s) 902, development operations table(s) 904, and/or application portfolio management table(s) 906 may also be populated in implicit relationship table 608.

VIII. Example Use Cases

The following use cases provide examples of how vulnerability response, development operations, and application portfolio management applications of a remote network management platform could use implicit configuration items individually or in conjunction with other information in the CMDB to provide new functionality. Nonetheless, these are just a limited number of examples. Thus, these and other remote network management platform applications may have additional uses of implicit configuration items.

In a first example, a vulnerability response application may identify relationships between source code under development in a managed network (e.g., discovered in a source code repository) and applications deployed on the managed network that were compiled from this source code. A static vulnerability checking tool may identify one or more vulnerabilities in the source code. Using the implicit relationship table, the vulnerability response application may then automatically flag these vulnerabilities against their compiled versions. Thus, vulnerabilities in compiled applications that are deployed for use can be found without scanning those compiled applications. Further, perhaps based on the IP addresses or other parameters associated with the compiled applications, the vulnerability response application may determine whether these applications are Internet-facing. Using the implicit relationship table, the vulnerability response application may write this information to the associated implicit configuration items. Then, the vulnerability response application may be able to more accurately assess the risk associated with vulnerabilities found in the source code.

In a second example, a development operations application may use the implicit relationship table and/or the vulnerability response table(s) to identify vulnerabilities found by the vulnerability response application in source code under development. From this information, the development operations application may be able to automatically generate change requests with the appropriate priority (e.g., based on severity of the vulnerabilities found) that describe the vulnerabilities in the source code. These change requests could then be integrated into the development process for the source code so that they can be addressed.

In a third example, a development operations application may be used to track the development of a particular software application. This software application may provide functionality that is part of a service covered by an application portfolio management application. The application portfolio management application may have determined that an important feature is missing from the software application. But, by using the implicit relationship table, the implicit configuration item table, and/or the development operations table(s), the application portfolio management application may determine that the missing feature is under development. The application portfolio management application may also be able to determine a scheduled release date for a new version of the software application that provides the missing feature. Therefore, the application portfolio management application can store this information in the application portfolio management table(s) and/or present it to users. This can result in the users understanding that the missing functionality will be provided and a time frame for when it will be available.

Any of these examples may also be applied to software applications that are developed and/or deployed on a public cloud network rather than a managed network.

IX. Example Operations

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform.

The embodiments of FIG. 10 may be simplified by the removal of any one or more of the features shown therein. Further, these embodiments may be combined with features, aspects, and/or implementations of any of the previous figures or otherwise described herein.

Block 1000 may involve receiving information related to a particular unit of source code associated with a managed network, wherein persistent storage contains: (i) an explicit configuration item table with entries of explicit configuration items representing hardware devices associated with the managed network and executable software applications deployed on the hardware devices, (ii) an implicit configuration item table with entries of implicit configuration items representing units of source code associated with the managed network, wherein at least some of the executable software applications are compiled versions of the units of source code, and (iii) an implicit relationship table associating pairs of the implicit configuration items and explicit configuration items with one another. This source code may be disposed upon the managed network, disposed upon a client or server device that is linked to or used by the managed network in some fashion, or associated with the managed network in some other way.

Block 1002 may involve writing, to the implicit configuration item table, at least some of the information as an implicit configuration item.

Block 1004 may involve determining that the implicit configuration item has one or more identifying attributes in common with an explicit configuration item in the explicit configuration item table.

Block 1006 may involve, possibly in response to determining that the implicit configuration item has one or more identifying attributes in common with the explicit configuration item, writing, to the implicit relationship table, a new entry associating the implicit configuration item and the explicit configuration item.

In some embodiments, the explicit configuration item represents a compiled version of the particular unit of source code, wherein the particular unit of source code and the compiled version of the particular unit of source code are both disposed upon the managed network.

In some embodiments, the explicit configuration item represents a compiled version of the particular unit of source code, wherein the particular unit of source code and the compiled version of the particular unit of source code are both disposed upon a public cloud network operated by an entity other than that which operates the managed network, and wherein the particular unit of source code and the compiled version of the particular unit of source code are accessible by way of an account associated with the managed network.

In some embodiments, the persistent storage also contains an application-specific table dedicated to a remote network management platform application, wherein the remote network management platform application is configured to write the information to the application-specific table, and wherein writing at least some of the information as the implicit configuration item comprises copying selected parts of the information from the application-specific table to the implicit configuration item table.

In some embodiments, the persistent storage also contains an application-specific table dedicated to a remote network management platform application, and wherein the remote network management platform application is configured to: (i) traverse the implicit relationship table until the new entry is found; (ii) locate, using the new entry, the implicit configuration item in the implicit configuration item table; and (iii) copy at least some attributes of the implicit configuration item to the application-specific table.

In some embodiments, the remote network management platform application is a development operations application, wherein copying at least some attributes of the implicit configuration item to the application-specific table comprises automatically generating a change request based on attributes of the implicit configuration item.

In some embodiments, the explicit configuration item represents a compiled version of the particular unit of source code, wherein the remote network management platform application is an application portfolio management application, and wherein copying at least some attributes of the implicit configuration item to the application-specific table comprises updating a representation of functionality provided by the compiled version of the particular unit of source code.

In some embodiments, the information is received from a remote network management platform application, wherein the remote network management platform application is a vulnerability response application, wherein the information is a vulnerability assessment of the particular unit of source code, and wherein the new entry indicates that the vulnerability assessment applies to the executable software applications represented by the explicit configuration item.

In some embodiments, the information includes the identifying attributes.

In some embodiments, the identifying attributes include one or more of an application name, an application version number, or an application identifier.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   persistent storage containing an implicit configuration item table and an implicit relationship table, wherein the implicit configuration item table contains entries of implicit configuration items, wherein each implicit configuration item corresponds to one or more units of source code stored within a source code repository accessible to a managed network, and wherein the implicit relationship table associates each of the implicit configuration items with executable software applications deployed on hardware devices associated with the managed network; and
   one or more processors configured to:
      receive vulnerability information related to a unit of source code implemented as part of the managed network;
      write, to the implicit configuration item table, at least some of the vulnerability information as part of an implicit configuration item;
      determine that the implicit configuration item has at least one identifying attribute in common with an executable software application deployed on a hardware device associated with the managed network;
      identify, by a vulnerability response application, a security-flag based on the executable software application corresponding to the implicit configuration item;
      write, to the implicit relationship table, a new security entry associating the implicit configuration item and the executable software application;
      determine, by the vulnerability response application, a risk associated with the new security entry, wherein the risk relates to the vulnerability information of the unit of source code; and
      generate, by a development operations application, a change request with a priority reflective of the risk, wherein the change request describes the vulnerability information of the unit of source code.

2. The system of claim 1, wherein an explicit configuration item represents a compiled or executable version of the unit of source code, wherein the unit of source code and the compiled or executable version of the unit of source code are both disposed upon one or more of the hardware devices, and wherein the implicit relationship table associates the implicit configuration item and the explicit configuration item.

3. The system of claim 1, wherein an explicit configuration item represents a compiled or executable version of the unit of source code that is disposed upon a public cloud network, and wherein the implicit relationship table associates the implicit configuration item and the explicit configuration item.

4. The system of claim 1, wherein a plurality of explicit configuration items represent compiled or executable versions of the unit of source code, and wherein writing the new security entry associating the implicit configuration item and the executable software application comprises writing, to the implicit relationship table, new entries respectively associating the implicit configuration item with each of the plurality of explicit configuration items.

5. The system of claim 1, wherein the one or more processors are further configured to:
   receive second information related to a second unit of source code;
   write, to the implicit configuration item table, at least some of the second information as a second implicit configuration item;
   determine that the second implicit configuration item has one or more further identifying attributes in common with the executable software application; and
   write, to the implicit relationship table, a second new security entry associating the second implicit configuration item and the executable software application.

6. The system of claim 1, wherein the persistent storage also contains an application-specific table dedicated to a software application, wherein the software application is configured to write the vulnerability information to the application-specific table, and wherein writing, to the implicit configuration item table, at least some of the vulnerability information as part of the implicit configuration item comprises copying selected parts of the vulnerability information from the application-specific table to the implicit configuration item table.

7. The system of claim 1, wherein the persistent storage also contains an application-specific table dedicated to a software application, and wherein the software application is configured to:
traverse the implicit relationship table until the new security entry is found;
locate, using the new security entry, the implicit configuration item in the implicit configuration item table; and
copy at least some attributes of the implicit configuration item to the application-specific table.

8. The system of claim 7, wherein the software application is the development operations application, and wherein copying at least some attributes of the implicit configuration item to the application-specific table comprises automatically generating a change request based on attributes of the implicit configuration item.

9. The system of claim 7, wherein an explicit configuration item represents a compiled or executable version of the unit of source code, wherein the software application is an application portfolio management application, wherein copying at least some attributes of the implicit configuration item to the application-specific table comprises updating a representation of functionality provided by the compiled or executable version of the unit of source code, and wherein the implicit relationship table associates the implicit configuration item and the explicit configuration item.

10. The system of claim 1, wherein the vulnerability information is received from a software application, wherein the software application is the vulnerability response application, wherein the vulnerability information is a vulnerability assessment of the unit of source code, wherein the new security entry indicates that the vulnerability assessment applies to the executable software applications represented by an explicit configuration item, and wherein the implicit relationship table associates the implicit configuration item and the explicit configuration item.

11. The system of claim 1, wherein the vulnerability information includes the at least one identifying attributes.

12. The system of claim 1, wherein the at least one identifying attributes includes one or more of an application name, an application version number, or an application identifier.

13. A computer-implemented method comprising:
receiving vulnerability information related to a unit of source code implemented as part of a managed network, wherein persistent storage contains an implicit configuration item table and an implicit relationship table, wherein the implicit configuration item table contains entries of implicit configuration items, wherein each implicit configuration item corresponds to one or more units of source code stored within a source code repository accessible to the managed network, and wherein the implicit relationship table associates each of the implicit configuration items with executable software applications deployed on hardware devices associated with the managed network;
writing, to the implicit configuration item table, at least some of the vulnerability information as part of an implicit configuration item;
determining that the implicit configuration item has at least one identifying attribute in common with an executable software application deployed on a hardware device associated with the managed network;
identifying, by a vulnerability response application, a security flag based on the executable software application corresponding to the implicit configuration item;
writing, to the implicit relationship table, a new security entry associating the implicit configuration item and the executable software application;
determining, by the vulnerability response application, a risk associated with the new security entry, wherein the risk relates to the vulnerability information of the unit of source code; and
generating, by a development operations application, a change request with a priority reflective of the risk, wherein the change request describes the vulnerability information of the unit of source code.

14. The computer-implemented method of claim 13, wherein an explicit configuration item represents a compiled or executable version of the unit of source code, wherein the unit of source code and the compiled or executable version of the unit of source code are both disposed upon one or more of the hardware devices, and wherein the implicit relationship table associates the implicit configuration item and the explicit configuration item.

15. The computer-implemented method of claim 13, wherein an explicit configuration item represents a compiled or executable version of the unit of source code that is disposed upon a public cloud network, and wherein the implicit relationship table associates the implicit configuration item and the explicit configuration item.

16. The computer-implemented method of claim 13, wherein a plurality of explicit configuration items represent compiled or executable versions of the unit of source code, and wherein writing the new security entry associating the implicit configuration item and the executable software application comprises writing, to the implicit relationship table, new entries respectively associating the implicit configuration item with each of the plurality of explicit configuration items.

17. The computer-implemented method of claim 13, further comprising:
receiving second information related to a second particular unit of source code;
writing, to the implicit configuration item table, at least some of the second information as a second implicit configuration item;
determining that the second implicit configuration item has one or more further identifying attributes in common with the executable software application; and
writing, to the implicit relationship table, a second new security entry associating the second implicit configuration item and the executable software application.

18. The computer-implemented method of claim 13, wherein the persistent storage also contains an application-specific table dedicated to a software application, wherein the software application is configured to write the vulnerability information to the application-specific table, and wherein writing, to the implicit configuration item table, at least some of the vulnerability information as part of the implicit configuration item comprises copying selected parts of the vulnerability information from the application-specific table to the implicit configuration item table.

19. The computer-implemented method of claim 13, wherein the persistent storage also contains an application-specific table dedicated to a software application, and wherein the software application is configured to:
traverse the implicit relationship table until the new security entry is found;

locate, using the new security entry, the implicit configuration item in the implicit configuration item table; and copy at least some attributes of the implicit configuration item to the application-specific table.

20. An article of manufacture including a non-transitory computer-readable medium, having stored thereon program instructions that, upon execution by a computing system, cause the computing system to perform operations comprising:

receiving vulnerability information related to a unit of source code implemented as part of a managed network, wherein persistent storage contains an implicit configuration item table and an implicit relationship table, wherein the implicit configuration item table contains entries of implicit configuration items, wherein each implicit configuration item corresponds to one or more units of source code stored within a source code repository accessible to the managed network, and wherein the implicit relationship table associates each of the implicit configuration items with executable software applications deployed on hardware devices associated with the managed network;

writing, to the implicit configuration item table, at least some of the vulnerability information as part of an implicit configuration item;

determining that the implicit configuration item has at least one identifying attribute in common with an executable software application deployed on a hardware device associated with the managed network;

identifying, by a vulnerability response application, a security flag based on the executable software application corresponding to the implicit configuration item;

writing, to the implicit relationship table, a new security entry associating the implicit configuration item and the executable software application;

determining, by the vulnerability response application, a risk associated with the new security entry, wherein the risk relates to the vulnerability information of the unit of source code; and generating, by a development operations application, a change request with a priority reflective of determined risk, wherein the change request describes the vulnerability information of the unit of source code.

* * * * *